United States Patent
Beck

(10) Patent No.: US 10,797,734 B2
(45) Date of Patent: Oct. 6, 2020

(54) SYSTEM WITH MULTIPLE VIRTUAL RADIO UNITS IN A RADIO UNIT THAT IS REMOTE FROM AT LEAST ONE BASEBAND CONTROLLER

(71) Applicant: CommScope Technologies LLC, Hickory, NC (US)

(72) Inventor: Andrew E. Beck, Ashburn, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/418,348

(22) Filed: May 21, 2019

(65) Prior Publication Data

US 2020/0044670 A1 Feb. 6, 2020

Related U.S. Application Data

(60) Provisional application No. 62/713,448, filed on Aug. 1, 2018.

(51) Int. Cl.
| | |
|---|---|
| *H04B 1/00* | (2006.01) |
| *H04L 25/03* | (2006.01) |
| *H04B 7/04* | (2017.01) |

(52) U.S. Cl.
CPC .......... *H04B 1/0039* (2013.01); *H04B 7/04* (2013.01); *H04L 25/03853* (2013.01)

(58) Field of Classification Search
CPC ........ H04B 1/0039; H04B 7/04; H04B 7/022; H04L 25/03853
See application file for complete search history.

(56) References Cited

U.S. PATENT DOCUMENTS

| | | | |
|---|---|---|---|
| 2004/0214576 A1 | 10/2004 | Myers et al. | |
| 2015/0303950 A1* | 10/2015 | Shattil | H04B 1/0003 370/328 |
| 2016/0037550 A1 | 2/2016 | Barabell et al. | |
| 2016/0242147 A1* | 8/2016 | Tarlazzi | H04W 72/04 |
| 2017/0164143 A1 | 6/2017 | Huang et al. | |
| 2017/0164215 A1 | 6/2017 | Chen et al. | |

(Continued)

FOREIGN PATENT DOCUMENTS

WO 2015120423 A1 8/2015

OTHER PUBLICATIONS

International Searching Authority, "International Search Report and Written Opinion from PCT Application No. PCT/US2019/033561 dated Sep. 10, 2019", from Foreign Counterpart to U.S. Appl. No. 16/418,348, pp. 1-10 Published: WO.

*Primary Examiner* — Vineeta S Panwalkar
(74) *Attorney, Agent, or Firm* — Fogg & Powers LLC

(57) ABSTRACT

A communication system is provided. The communication system includes a at least one baseband controller configured to process signals in a baseband frequency band. The communication system also includes at least one radio unit that is physically remote from the at least one baseband controller. Each radio unit includes a plurality of virtual radio units (VRUs) in a physical housing of the respective radio unit. Each radio unit also includes a fronthaul interface configured to communicate with the at least one baseband controller using a packet-based protocol on behalf of each VRU. Each radio unit also includes at least one radio frequency front end unit configured to transmit from and receive on behalf of each of the VRUs.

19 Claims, 5 Drawing Sheets

(56) References Cited

U.S. PATENT DOCUMENTS

| | | | |
|---|---|---|---|
| 2018/0054817 A1* | 2/2018 | Jabara | H04W 88/085 |
| 2018/0063847 A1 | 3/2018 | Huang et al. | |
| 2018/0276051 A1* | 9/2018 | Wen | G06F 9/30087 |
| 2019/0109899 A1* | 4/2019 | Newton | H04L 67/1023 |
| 2019/0320487 A1* | 10/2019 | Khan | H04W 76/27 |
| 2019/0349317 A1* | 11/2019 | Lu | H04L 69/22 |

\* cited by examiner

SYSTEM WITH MULTIPLE VIRTUAL RADIO UNITS IN A RADIO UNIT THAT IS REMOTE FROM AT LEAST ONE BASEBAND CONTROLLER

CROSS-REFERENCE TO RELATED APPLICATIONS

This application claims the benefit of U.S. Provisional Patent Application Ser. No. 62/713,448 filed on Aug. 1, 2018, entitled "SYSTEM WITH MULTIPLE VIRTUAL RADIO UNITS IN A RADIO UNIT THAT IS REMOTE FROM AT LEAST ONE BASEBAND CONTROLLER", the entirety of which is incorporated herein by reference.

BACKGROUND

Some modern cellular base station equipment separates the radio equipment and the baseband equipment into different functional and physical entities. Additionally, packet-based fronthaul interfaces are being used between a radio equipment and a baseband equipment. Therefore, it may be beneficial to provide functionality for multiple radio units in a single radio unit to take advantage of packet-based fronthaul interfaces in base stations using a distributed architecture.

SUMMARY

A communication system is disclosed. The communication system includes a at least one baseband controller configured to process signals in a baseband frequency band. The communication system also includes at least one radio unit that is physically remote from the at least one baseband controller. Each radio unit includes a plurality of virtual radio units (VRUs) in a physical housing of the respective radio unit. Each radio unit also includes a fronthaul interface configured to communicate with the at least one baseband controller using a packet-based protocol on behalf of each VRU. Each radio unit also includes at least one radio frequency front end unit configured to transmit from and receive on behalf of each of the VRUs.

DRAWINGS

Understanding that the drawings depict only exemplary configurations and are not therefore to be considered limiting in scope, the exemplary configurations will be described with additional specificity and detail through the use of the accompanying drawings, in which.

Figure 1:
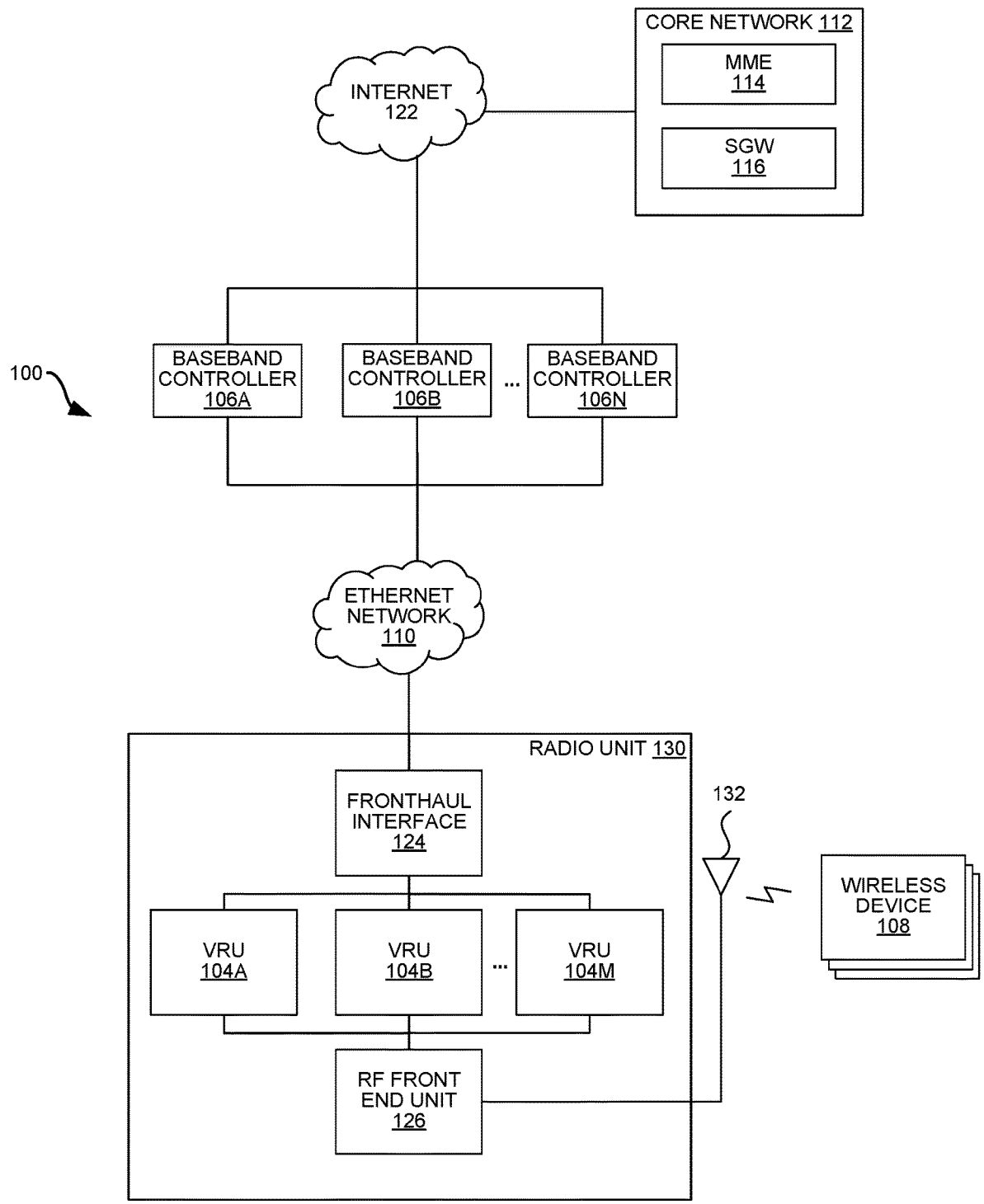
FIG. 1 is a block diagram illustrating an example system with multiple virtual radio units (VRUs) in a radio unit that is remote from at least one baseband controller.

In accordance with common practice, the various described features are not drawn to scale but are drawn to emphasize specific features relevant to the exemplary configurations.

DETAILED DESCRIPTION

Separating radio equipment and baseband equipment into different functional and physical entities may maximize the radio performance of a base station (by mounting the radio equipment near the antenna(s)) while minimizing the equipment that is mounted outside on a tower. Furthermore, in a separated architecture, baseband processing resources may (but are not required to be) flexibly be pooled together in a central location.

Traditionally, the fronthaul interface between radio equipment and baseband equipment may use a point-to-point semi-standard protocol such as the Common Public Radio Interface (CPRI) or the Open Base Station Architecture Initiative (OBSAI). There is currently a movement in the wireless industry to make the fronthaul interface between the radio equipment and the baseband equipment more open-standard to facilitate more equipment interoperability (e.g., between equipment made by different equipment vendors) as well as incorporate methods to reduce the required link bandwidth and increase link reliability.

One such example of this type of fronthaul interface is that proposed by extensible Radio Access Network (XRAN) from their Next Generation Fronthaul Interface working group. In this example, Ethernet is proposed for the transport layer between the radio equipment (also referred to as the Radio Unit, RU) and the baseband equipment. Ethernet has advantages because it is a widely used and understood protocol, and it easily supports physically-remote and/or centrally-located baseband equipment communicating with remote RU equipment over a standard network.

Another trend in the wireless/cellular industry is the densification of base stations. More base stations are being added to wireless networks to increase capacity. There are often challenges installing this equipment including locating suitable space, achieving zoning approvals, and erecting support structures. This challenge is exacerbated when multiple wireless carriers are all trying to cover the same region and all require independent equipment. Shared space or shared networks may be to co-locate equipment. The neutral host concept is often used for Distributed Antenna System (DAS) equipment where a third party installs an RF distribution network that multiple wireless carriers connect to for shared access to a coverage area.

In order to take advantage of packet-based fronthaul interface protocols and accommodate the densification trend, the present systems and methods herein describe a system that consolidates multiple virtual radio units in a radio unit that is remote from baseband equipment. Programmable circuitry (e.g., a field programmable gate array (FPGA), application specific integrated circuit (ASIC), microprocessor, digital signal processor (DSP), etc.) in a single housing may include multiple processing cores, each of which implement a virtual radio unit (VRU). Each of the multiple VRUs may be packet-addressable, and therefore be able to share a single physical link (e.g., Ethernet) to communicate with various baseband equipment. The multiple VRUs may share a common antenna system and/or radio frequency front end circuitry.

As will be discussed in greater detail below, the systems and methods disclosed herein may have several advantages compared to conventional base stations, even compared to other distributed base stations with separated radio equipment and baseband equipment. For example, the systems and methods disclosed herein may enable more small cells to be deployed while minimizing the challenges associated with such deployment. The systems and methods disclosed herein may also enable remote modification of radio equipment, as well as increase interoperability between equipment owned by different carriers.

FIG. 1 is a block diagram illustrating an example communication system 100 with multiple virtual radio units (VRUs) 104A-M in a radio unit 130 that is remote from at least one baseband controller 106A-N. One or more of the VRUs 104 and one or more of the baseband controllers 106 may collectively implement the functionality of one or more base stations deployed in a wireless communication system, e.g., in a centralized radio access network (C-RAN) architecture. The radio unit 130 may be a physical housing (e.g., a chassis attached to an antenna tower) deployed at a site to provide wireless coverage and capacity for one or more wireless network operators. The physical location of the radio unit 130 may be strategically chosen by one or more network operators (i.e., carrier) based on network demand, signal propagation characteristics, location of other radio units 130, etc.

In one configuration, the system 100 may be part of a Long Term Evolution (LTE) radio access network providing wireless service using an LTE air interface. LTE is a standard developed by the Third Generation Partnership Project (3GPP) standards organization. In an LTE configuration, a VRU 104 and a baseband controller 106 together may be used to implement an LTE Evolved Node B (also referred to here as an "eNodeB" or "eNB") that is used to provide wireless devices 108 with access to the wireless network operator's core network 112 to enable the wireless devices 108 to wirelessly communicate data and voice (using, for example, Voice over LTE (VoLTE) technology).

In an LTE configuration, each core network 112 may be implemented as an Evolved Packet Core (EPC) 112 comprising LTE EPC network elements such as, for example, a mobility management entity (MME) 114 and a Serving Gateway (SGW) 116 and, optionally, a Home eNodeB gateway (HeNB GW) (not shown in FIG. 1) and a Security Gateway (SeGW) (not shown in FIG. 1).

Furthermore, systems and methods of this disclosure can be utilized with any release of the LTE standard, including Frequency-Division Duplex (FDD) and Time-Division Duplex (TDD) variants, or with a variety of other future or existing air interface technologies, such as 5G New Radio (NR), the IEEE 802.11, which is more popularly known as Wi-Fi, or IEEE 802.16, which is also known as Wi-Max, or even 3G air interfaces such as Universal Mobile Telecommunications System (UMTS).

The system 100 may include multiple virtual radio units (VRUs) 104 in a single radio unit 130 that is physically remote from one or more baseband controllers 106. The baseband controllers 106 may be co-located (e.g., in a central baseband unit (not shown)) or physically remote from each other (e.g., if multiple wireless operators share single radio unit 130). Alternatively, some of the baseband controllers 106 (e.g., baseband controllers B-N) may be located in the same location and/or housing while others (e.g., baseband controller A) are physically remote. Each baseband controller 106 may perform baseband processing for a particular air interface that is being used to wirelessly communicate over the RF channel, i.e., from an antenna system 132 to the wireless device(s) 108. The baseband controllers 106 may process signals in the baseband frequency range, the lowest range of frequency spectrum. The baseband controllers 106 may provide the signaling, timing, framing, messaging, and control system interface between the core network 112 and the radio unit 130. The baseband controllers 106 may operate on incoming and outgoing digital signals, and provide functions such as resource element mapping/de-mapping, precoding, equalization, layer mapping, scrambling/de-scrambling, coding/de-coding, modulation and/or rate-matching. In some instances, one or more of these functions could additionally, or alternatively, be implemented in the VRU 104.

In contrast to proprietary (or semi-proprietary) fronthaul interface standards (e.g., the Common Public Radio Interface (CPRI) and/or Open Base Station Architecture Initiative (OBSAI) family of specifications), newer fronthaul interfaces 124 may utilize an Ethernet network 110 (e.g., an enterprise-grade Ethernet network) to transport in-phase and quadrature (IQ) data between the baseband equipment and radio equipment.

In order to save bandwidth across the Ethernet network 110, some of these Ethernet-based fronthaul interfaces 124 may communicate IQ data representing frequency-domain symbols for the air interface (rather than time-domain IQ data) between the baseband controllers 106 and the VRUs 104. This frequency-domain IQ data may represent the symbols in the frequency domain. Each VRU 104 may then perform an inverse fast Fourier transform (IFFT) to produce the time-domain IQ data. Some other Ethernet-based fronthaul interfaces 124 may communicate IQ data at a reduced data rate either as a result of downsampling the data to a baseband frequency or filtering the data to a reduced bandwidth. It should also be noted, that any suitable compression and processing techniques may be used to enable the use of an Ethernet-based fronthaul interface 124.

Each baseband controller 106 may be implemented in software and/or firmware executing on one or more suitable programmable processors. Each baseband controller 106 (or portions thereof) can be implemented in other ways (for example, in a field programmable gate array (FPGA), application specific integrated circuit (ASIC), etc.). Each baseband controller 106 may include one or more baseband modems (not shown). In one configuration, one or more virtual radio units (VRUs) 104 together with a baseband modem (in a baseband controller 106) form a physical cell, e.g., each baseband modem may have the data transmission capacity of a single LTE cell/sector. Alternatively, multiple baseband modems (in the same or different baseband controller 106) may serve a single cell. Alternatively, or additionally, a particular baseband modem may serve multiple cells.

The radio unit 130 may include multiple independent VRUs 104 that each perform processing to convert a baseband signal from one or more baseband controllers 106 into an RF signal that can be radiated from the antenna system 132 (that is connected to an RF front end unit 126), i.e., each VRU 104 may perform processing for the air interface that is not performed in the baseband controller 106. The VRU 104 processing may include modulating the baseband signal, e.g., using QPSK, 16QAM, 64QAM, etc. The VRU(s) 104 further may include data compression and decompression functions as well as digital beamforming, cyclic prefix addition/removal, and/or FFT/iFFT functions. In one configuration, multiple VRUs 104 may cooperatively operate in a Coordinated Multi Point (CoMP) or Carrier Aggregation (CA) methodology, e.g., in a similar way that independent radio units (i.e., if not implemented using VRUs 104) would work together in a CoMP or CA methodology.

One or more VRUs 104 may belong to a particular cell. If multiple VRUs 104 belong to a particular cell, each of the VRUs 104 may broadcast the same cell identifier, e.g., an LTE Cell-ID in LTE Primary and Secondary Synchronization Signals (PSS/SSS). Each of the VRUs 104 in a particular cell may communicate with the at least one baseband controller 106 (e.g., one or more baseband modems in at least one baseband controller 106) that is serving the particular cell.

The RF front end unit 126 may include a receive chain and a transmit chain, and may connect to a common shared antenna system 132. The receive chain may include circuitry configured to filter, mix, amplify, and/or digitize analog signals received from wireless devices 108 (via the shared antenna system 132) and pass them to the appropriate VRU 104. The transmit chain may include circuitry configured to convert digital signals received from the VRUs 104 into analog signals, then mix and amplify the analog signals before they are transmitted to one or more wireless devices 108 (via the one or more antennas 132). The antenna system 132 may include one or more antennas used to transmit downlink signals to and receive uplink signals from the wireless devices 108.

In one configuration, each VRU 104 may have a different internet protocol (IP) address and appear to the baseband controller 106 (that the VRU 104 is communicating with) as an independent radio unit 130, i.e., multiple VRUs 104 may coexist in the same physical housing (i.e., the radio unit 130), but may be individually addressable using their respective IP addresses.

In another configuration, each VRU 104 may have a common internet protocol (IP) address, but a different internet protocol (IP) address port number, and appear to the baseband controller 106 (that the VRU 104 is communicating with) as an independent radio unit 130, i.e., multiple VRUs 104 may coexist in the same physical housing (i.e., the radio unit 130), but may be individually addressable using their respective IP addresses port number. In such a configuration, The VRUs 104 may all recognize the same IP address, but each VRU 104 may be configured to only recognize a particular port number assigned to that respective VRU 104.

Each of the multiple VRUs 104 may be implemented as an independent digital instance (e.g., a processing core) on one or more programmable processors, e.g., where each programmable processor is an FPGA, ASIC, microprocessor or DSP device. The multiple VRUs 104 may share analog components in a single RF front end unit 126, e.g., one or more antenna, band pass filter, low noise amplifier, power amplifier, duplexer, etc. that implement the receive chain and the transmit chain. Alternatively, the radio unit 130 may include more than one RF front end unit 126, e.g., an RF front end unit 126 for each of the VRUs 104 in the radio unit 130. Since the processor implementing the VRUs 104 may be programmable, VRUs 104 may be added, deleted, and/or reconfigured by changing the software and/or firmware in the process remotely, i.e., without having a technician at the site of the radio unit 130. Each processing core in the programmable processor may use a unique set of instructions (software and/or firmware) to implement a particular VRU 104. Alternatively, different multiple VRUs 104 may share some or all of the instructions implementing the VRUs 104.

In addition to remotely adding, deleting, and reconfiguring VRUs 104, the system 100 described herein may have several other advantages. First, in contrast to many other systems, the system 100 described herein may enable many different VRUs 104 to share the same radio unit 130, thus minimizing the aesthetic and physical impact associated with deploying radio equipment in new locations and enabling denser placement of radio equipment per physical area.

Second, the system 100 described herein may enable easier compatibility between radio equipment (and/or between radio equipment and baseband equipment). In one configuration, two VRUs 104 may be used to implement different frequency bands or channels for a common wireless carrier. In another configuration, two VRUs 104 may be used to implement different frequency bands or channels for different wireless carriers. For example, a first VRU 104 may implement (i.e., communicate on) the 1900 MHz LTE frequency band, while a second VRU 104 may implement the 2100 MHz LTE frequency band (for the same or different wireless carrier as the first VRU 104). Multiple VRUs 104 may implement any specific combination of the following frequency bands: 600 MHz LTE, 700 MHz LTE, 800 MHz LTE, 850 MHz LTE, 900 MHz LTE, 1500 MHz LTE, 1700 MHz LTE, 1700 MHz LTE, 1800 MHz LTE, 1900 MHz LTE, 1500 MHz LTE, 2100 MHz LTE, 2300 MHz LTE, 3500 MHz LTE, etc. Despite these differences, the multiple VRUs 104 may be included in the same physical housing (i.e., the same radio unit 130), may use the same fronthaul interface 124, and/or may use the same RF front end unit 126 and antenna system 132.

Furthermore, two VRUs 104 in the same radio unit 130 may use different air standards, but may be included in the same physical housing (i.e., the same radio unit 130), may use the same fronthaul interface 124, and/or may use the same RF front end unit 126 and antenna system 132. For example, a first VRU 104 may communicate to wireless devices 108 using LTE, while a second VRU 104 may use a non-LTE standard, e.g., WiMAX, UMTS, Wi-Fi, etc. Additionally, or alternatively, a first VRU 104 may communicate to wireless devices 108 using Time Division Duplex (TDD), while a second VRU 104 may use Frequency Division Duplex (FDD).

Furthermore, two VRUs 104 in the same radio unit 130 may use different modulation schemes, but may be included in the same physical housing (i.e., the same radio unit 130), may use the same fronthaul interface 124, and/or may use the same RF front end unit 126 and antenna system 132. For example, a first VRU 104 may communicate to wireless devices 108 using a first modulation scheme, while a second VRU 104 may use a second modulation scheme. Multiple VRUs 104 may use any specific combination of the following modulation schemes: quadrature phase-shift keying (QPSK), 16-phase quadrature amplitude modulation (16QAM), 64-state quadrature amplitude modulation (64QAM), other phase-shift keying (PSK), other quadrature amplitude modulation (QAM), frequency-shift keying (FSK), amplitude-shift keying (ASK) modulation, etc. Additionally, or alternatively, two baseband controllers 106 may be operated by different wireless carriers, but still be able to communicate with their respective corresponding VRU 104 via the same fronthaul interface 124.

Third, the system 100 may allow the baseband equipment to be located further away from the radio equipment. Having less equipment at the radio unit 130 site (e.g., a tower) means less maintenance, power, and/or cooling, which may reduce costs for carriers.

Figure 2:
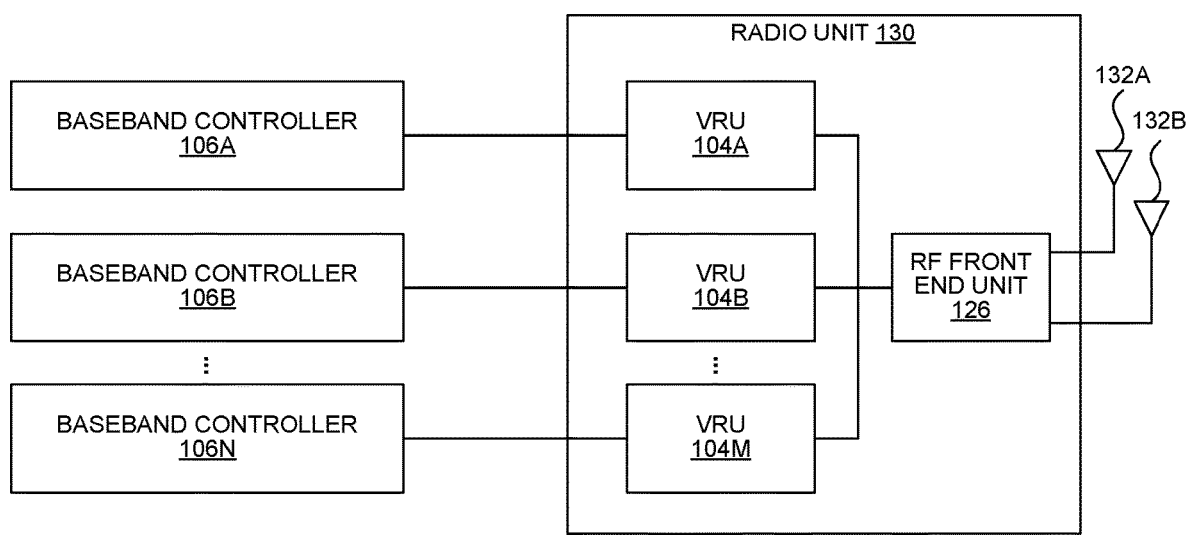
FIG. 2 is block diagram illustrating logical connections between multiple baseband controllers and multiple VRUs in a radio unit.

FIG. 2 is block diagram illustrating logical connections between multiple baseband controllers 106A-N and multiple VRUs 104A-M in a radio unit 130. As described above, multiple VRUs 104 may be housed within a physical radio unit 130, and multiple baseband controllers 106 may be remotely located from the radio unit 130, e.g., in the same or different housing. In some configurations, some of the baseband controllers (e.g., baseband controllers 106B-N) may be in the same physical housing, but not other baseband controller(s) (e.g., baseband controller 106A).

Although not illustrated in FIG. 2, an Ethernet network 110 (and fronthaul interface 124) may be used to connect each VRU 104 to its corresponding baseband controller 106. VRUs 104 may be added, deleted, and/or modified via software and/or firmware to adjust the radio unit 130 to service different users from a common hardware platform.

Additionally, the system 100 may involve any number of baseband controllers 106 and VRUs 104 greater than 1, e.g., N=2, 3, ..., 100. Furthermore, the number of baseband controllers 106 need not be the same as the number of VRUs 104 in the system 100, i.e., in some configurations M≠N. Furthermore, more than one baseband controller 106 may be used to serve a particular VRU 104 or a single baseband controller 106 may be used to serve more than one VRU 104. However, the system 100 in FIG. 2 is illustrated (and described) as having a 1:1 baseband controller 106 to VRU 104 ratio.

In the system 100, each baseband controller 106 may communicate with a corresponding VRU 104 and preferably has no direct interaction with other VRUs 104 that are also present in the radio unit 130. For example, a first baseband controller 106A may communicate with a first VRU 104A. However, the first baseband controller 106 preferably does not interact or communicate with (and is preferably not even aware of) the other VRUs 104B-M in the same radio unit 130 as the first VRU 104A. Similarly, a second baseband controller 106B may communicate with a second VRU 104B, but preferably not the other VRUs 104A, 104C-M in the same radio unit 130 as the second VRU 104B. The VRUs 104 may share common radio unit 130 infrastructure function(s), such as power, clock signals, and/or cooling fans, etc.

The physical connection (into the radio unit 130) may involve only one physical link (e.g., Ethernet link), and the VRU 104 connections may be segmented by their IP address. Thus, a single Ethernet port could act as the sole physical data connection into the radio unit 130, and packets may be routed to the appropriate VRU 104 using the packet IP address, e.g., the IP address located in a received packet header. In other words, the fronthaul interface 124 may communicate with one or more baseband controllers 106 (on behalf of multiple VRUs 104) via a single Ethernet port.

The baseband controllers 106 and/or the VRUs 104 may access the Ethernet network 110 (e.g., the Internet cloud) on an encrypted link, e.g., using Secure Sockets Layer (SSL), Transport Security Layer (TSL), or any other suitable encryption mechanism. Each baseband controller 106 may know the IP address of the VRU 104 it communicates with, and each VRU 104 may know the IP address of the baseband controller 106 that it communicates with. Furthermore, each baseband controller 106 would not need to know that there may be other VRUs 104 operating (e.g., in the same or different bands and/or by other wireless carriers) within the same radio unit 130.

Older distributed base station architectures (e.g., using the CPRI or OBSAI family of specifications) generally locate more of the high data rate processing in the radio equipment and use compression technology between the radio unit 130 and baseband controllers 106. In contrast, newer interface technology protocols (e.g., standards developed by XRAN or Institute of Electrical and Electronics Engineers (IEEE)) reduce bandwidth requirements between the radio unit 130 and the baseband controllers 106. Because of the reduced bandwidth demand of modern fronthaul interfaces 124 (and because today's Internet interfaces are supporting higher fundamental bandwidths), multiple VRUs 104 may be supported over a single (e.g., Ethernet) network connection. In other words, multiple VRUs 104 may share a common fronthaul interface 124.

The VRUs 104 may be implemented on at least one programmable processor in the radio unit 130, e.g., where each programmable processor is an FPGA, ASIC, microprocessor or DSP device. In some configurations the VRUs 104 are implemented across multiple programmable processors of different types, e.g., a first VRU 104 is implemented on a first type of programmable processor (e.g., FPGA), a second VRU 104 is implemented on a second type of programmable processor (e.g., ASIC), etc. Each VRU 104 may be implemented in a separate processing core within the at least one programmable processor. Although not illustrated in FIG. 2, the fronthaul interface 124 may also be implemented in the programmable processor. Alternatively, the fronthaul interface 124 may be implemented in the radio unit 130, but not on the programmable processor.

The VRUs 104 may share a common RF front end unit 126. As will be discussed below, the RF front end unit 126 may include various analog components, e.g., one or more band pass filters, low noise amplifiers, power amplifiers, and/or duplexers to implement a receive chain and a transmit chain. The RF front end unit 126 may access two antennas 132A-B to transmit downlink signals to and receive uplink signals from one or more wireless devices 108. Alternatively, the radio unit 130 may include more than one RF front end unit 126, e.g., an RF front end unit 126 for each VRU 104. Furthermore, each front end unit 126 may access more or less than two antennas 132.

Figure 3:
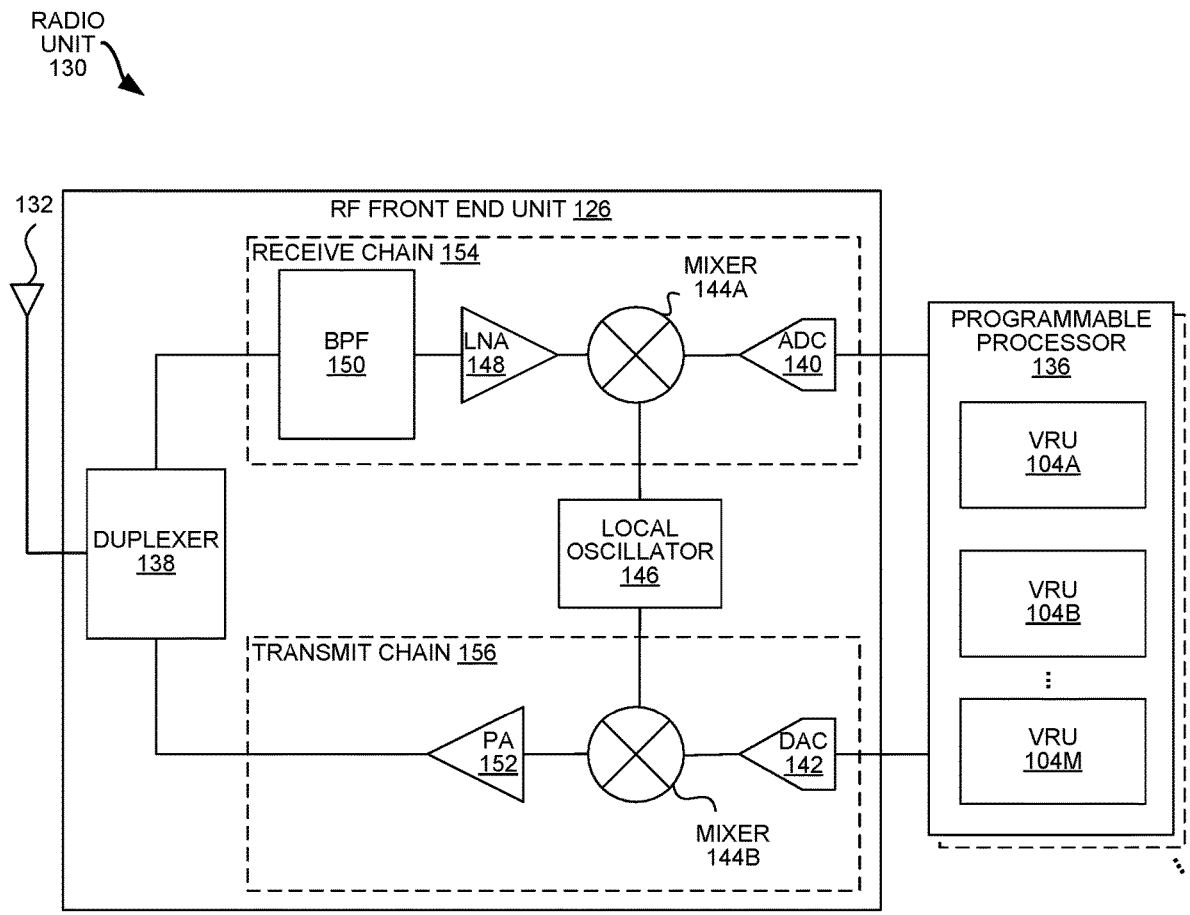
FIG. 3 is a block diagram illustrating an RF front end unit and a programmable processor in a radio unit.

FIG. 3 is a block diagram illustrating an RF front end unit 126 and at least one programmable processor 136 in a radio unit 130. The radio unit 130 may be used to implement RF functionality in a communication system 100. The radio unit 130 may communicate with one or more baseband controllers 106 (e.g., via an Ethernet network 110 and fronthaul interface 124) and one or more wireless devices 108 (e.g., via an air interface).

The programmable processor 136 may include multiple VRUs 104 (M=2, 3, ... 100). In one configuration, each of the VRUs 104 may be included in a single programmable processor 136. Alternatively, the VRUs 104 may be implemented across multiple programmable processors 136. Each VRU 104 may perform processing along with the RF front end to convert a baseband signal (from one or more baseband controllers 106) into an RF signal that is radiated from one or more antennas 132 that are connected to the RF front end unit 126. In other words, each VRU 104 may perform processing for an air interface that is not performed in the baseband controller 106. Each of the multiple VRUs 104 may be implemented in a respective processing core of the at least one programmable processor 136. Each of the at least one programmable processor 136 may be an FPGA, ASIC, microprocessor or DSP. Although it is not illustrated in FIG. 3, each of the at least one programmable processor 136 may also include a fronthaul interface 124. Alternatively, the radio unit 130 may include a fronthaul interface 124 that is not implemented in the at least one programmable processor 136.

Preferably, the multiple VRUs 104 may share a single RF front end unit 126. However, the radio unit 130 may include multiple RF front end units 126, e.g., an RF front end unit 126 for each VRU 104. The RF front end unit 126 may include a receive chain 154 and a transmit chain 156. It is understood that the receive chain 154 and transmit chain 156 configurations illustrated in FIG. 3 are merely examples, and other configurations for an RF front end units 126 may be used.

The receive chain 154 may include circuitry configured to filter, mix amplify, and digitize analog signals received from wireless devices 108 (via one or more antennas 132) and pass them to the appropriate VRU(s) 104. Specifically, an RF analog signal may be received wirelessly at the one or more antennas 132 connected to the RF front end unit 126 and fed to a duplexer 138. The duplexer 138 may be configured to selectively enable a signal from the antenna 132 to pass through the receive chain 154 or a signal from the transmit chain 156 to pass through to the antenna 132, but not both at the same time. In this way, the duplexer 138 may minimize interference between signals in the receive chain 154 and the transmit chain 156, and enable the receive chain 154 and the transmit chain 156 to share the same one or more antennas 132. The duplexer 138 may be implemented using one or more switches, filters or other circuitry configured to select between different signal paths. A band-pass filter (BPF) 150 in the receive chain 154 may be configured to filter the received analog signal to prevent out-of-band signals from propagating through the receive chain 154, i.e., frequency components above and below a particular frequency band may be attenuated or eliminated by the BPF 150 while the components in a desired frequency band remain unattenuated (or minimally attenuated). The output of the BPF 150 may be fed into a low-noise amplifier 148 that may be configured to amplify the output of the BPF 150. A first mixer 144A may then be configured to mix the output of the LNA 148 with a sinusoidal signal from a local oscillator 146, e.g., to downconvert the output of the LNA 148 from the RF band of the received signal to an intermediate frequency (IF) band. An analog-to-digital converter (ADC) 140 may be configured to digitize the mixed signal before sending to a VRU 104.

The transmit chain 156 may include circuitry configured to convert digital signals received from the VRUs 104, then mix and amplify the analog signals before they are transmitted to one or more wireless devices 108 (via the one or more antennas 132). A digital-to-analog converter (DAC) 142 may be configured to convert a digital signal from a VRU 104 to an analog signal, which is then fed into a second mixer 144B. The second mixer 144B may then be configured to mix the output of the DAC 142 with a sinusoidal signal from the local oscillator 146, e.g., to upconvert the output of the DAC from an intermediate frequency (IF) band to an RF band. The analog RF signal may then be input into a power amplifier (PA) 152 that may be configured to increase the power of the signal before transmitting to one or more wireless devices 108 via the one or more antennas 132.

Figure 4:
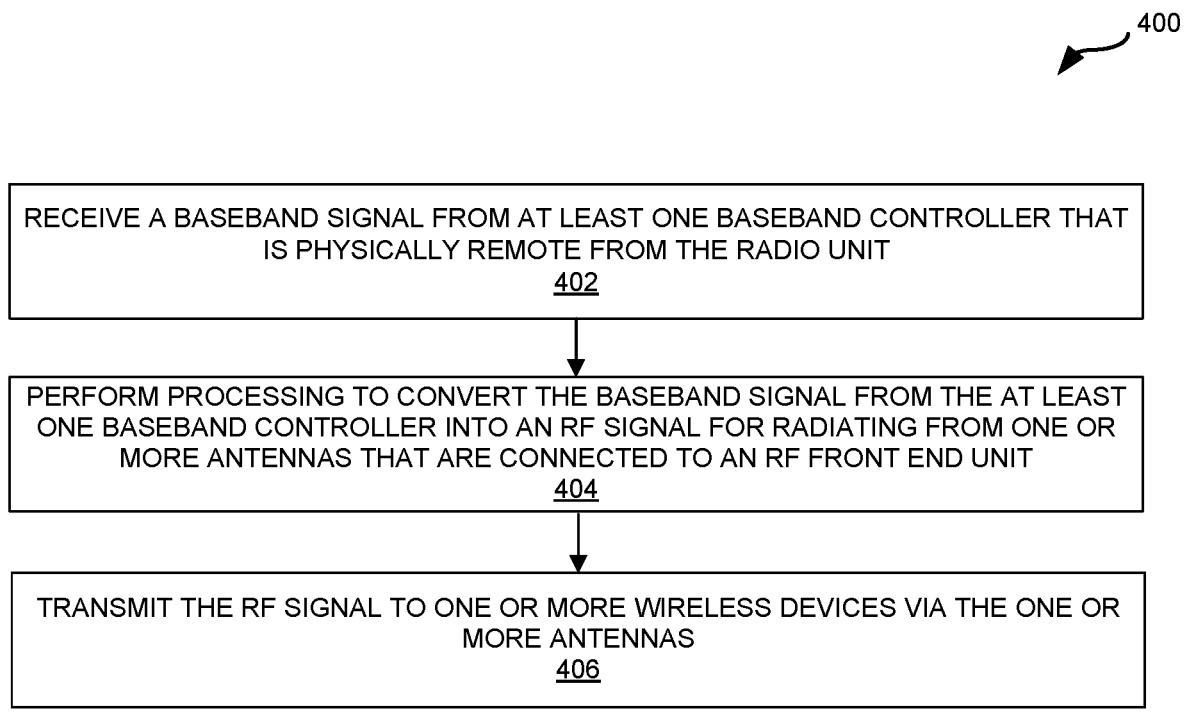
FIG. 4 is a flow diagram illustrating a method for using a radio unit with multiple VRUs to transmit a wireless signal to one or more wireless devices.

FIG. 4 is a flow diagram illustrating a method 400 for using a radio unit 130 with multiple VRUs 104 to transmit a wireless signal to one or more wireless devices 108. The method 400 may be performed by a radio unit 130 in a communication system 100. The multiple VRUs 104 in the radio unit 130 may each be implemented in a separate processing core in at least one programmable processor 136, e.g., where each programmable processor 136 is an FPGA, ASIC, microprocessor or DSP device. Different VRUs 104 may implement the same or different frequency bands, air standards, and/or modulation schemes for the same or different wireless carriers.

In addition to the radio unit 130, the system 100 may one or more baseband controllers 106 that are physically remote from the radio unit 130. Alternatively, the multiple baseband controllers 106 may be located in multiple physical locations, all of which are remote from the radio unit 130. The one or more baseband controllers may perform baseband processing to generate a baseband signal.

The radio unit 130 may be configured to receive 402 a baseband signal from at least one baseband controller 106 that is physically remote from the radio unit 130. Each VRU 104 may be configured to communicate with only one baseband controller 106 or more than one baseband controller 106. The radio unit 130 may include a fronthaul interface 124 that is configured to access an Ethernet network 110 to communicate with the one or more baseband controllers 106. The VRUs 104 may access the Ethernet network 110 (e.g., the Internet) using an encrypted connection. The fronthaul interface 124 may be implemented in the same programmable processor 136 as the VRUs 104. Alternatively, the fronthaul interface 124 may be located in the radio unit 130, but not implemented in the same programmable processor 136 as the VRUs 104. Since the VRUs 104 may be individually addressable (i.e., they each have their own IP address), a single Ethernet port may act as the only physical data connection into the radio unit 130, and packets may be routed to the appropriate VRU 104 using a respective IP address for the VRU 104.

The radio unit 130 may be configured to perform 404 processing to convert the baseband signal (e.g., frequency-domain IQ data) from the at least one baseband controller 106 into an RF signal for radiating from an antenna system 132 that is connected to an RF front end unit 126, i.e., each VRU 104 may perform processing for the air interface that is not performed in the baseband controller 106. In some configurations, the processing may include performing an inverse fast Fourier transform (IFFT), on frequency-domain IQ data from a baseband controller 106, to produce the time-domain IQ data. The baseband signal from the baseband controller 106 may be transmitted as frequency-domain IQ data because it is smaller in size, and requires less bandwidth to transmit, than the corresponding time-domain IQ data. The processing may also include one or more of the VRUs 104 modulating the time-domain IQ data, e.g., using QPSK, 16QAM, 64QAM, etc. The processing may also include an RF front end unit 126 converting the modulated digital signal received from the VRUs 104 into analog signals, then mixing and amplifying the analog signals.

The radio unit 130 may be configured to transmit 406 the RF signal to one or more wireless devices 108 via the one or more antennas 132. Each of the VRUs 104 may share the same RF front end 126 and/or one or more antennas 132. Alternatively, the radio unit 130 may include more than one RF front end units 126, e.g., an RF front end unit 126 for each VRU 104.

Figure 5:
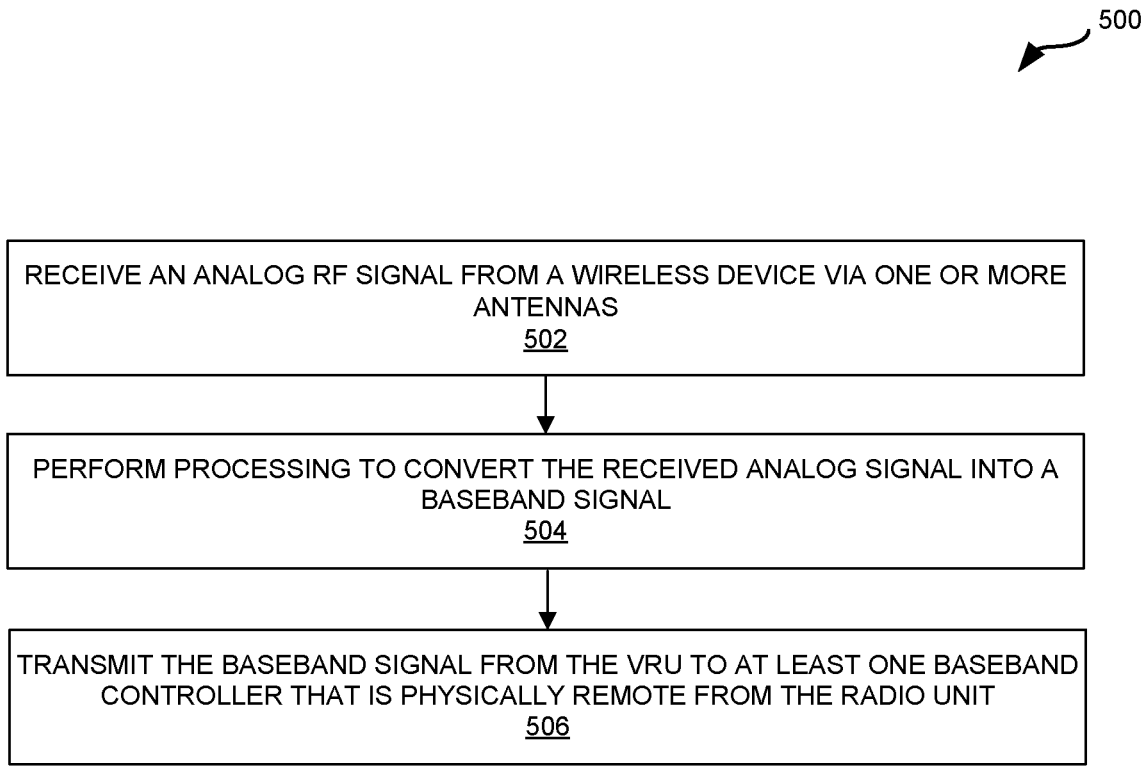
FIG. 5 is a flow diagram illustrating a method for using a radio unit with multiple VRUs to receive a wireless signal from one or more wireless devices.

FIG. 5 is a flow diagram illustrating a method 500 for using a radio unit 130 with multiple VRUs 104 to receive a wireless signal from a wireless device 108. The method 500 may be performed by a radio unit 130 in a communication system 100. The multiple VRUs 104 in the radio unit 130 may each be implemented in a separate processing core in at least one programmable processor 136, e.g., where each programmable processor 136 is an FPGA, ASIC, microprocessor or DSP device. Different VRUs 104 may implement the same or different frequency bands, air standards, and/or modulation schemes for the same or different wireless carriers.

In addition to the radio unit 130, the system 100 may one or more baseband controllers 106 that are physically remote from the radio unit 130. Alternatively, the multiple baseband controllers 106 may be located in multiple physical locations, all of which are remote from the radio unit 130.

The radio unit 130 may be configured to receive 502 an analog RF signal from a wireless device 108 via the one or more antennas 132. Each of the VRUs 104 may share the same RF front end 126 and/or one or more antennas 132. Alternatively, the radio unit 130 may include more than one RF front end unit 126, e.g., an RF front end unit 126 for each VRU 104.

The radio unit 130 may be configured to perform 504 processing to convert the received analog RF signal into a baseband signal. In some configurations, the processing may include filtering, mixing, amplifying, and/or digitizing the received analog RF signal and passing it to the appropriate VRU 104, e.g., by an RF front end unit 126. The processing may also include the VRU 104 demodulating the time-domain IQ data from the RF front end unit 126, e.g., using QPSK, 16QAM, 64QAM, etc. The processing may also include the VRU 104 performing a fast Fourier transform (FFT), on the demodulated time-domain IQ data, to produce frequency-domain IQ data. The frequency-domain IQ data may be smaller in size and require less bandwidth to transmit to a baseband controller 106, than the corresponding time-domain IQ data.

The radio unit 130 may be configured to transmit 506 the baseband signal (e.g., frequency-domain IQ data) from the VRU 104 to at least one baseband controller 106 that is physically remote from the radio unit 130. Each VRU 104 may be configured to communicate with only one baseband controller 106 or more than one baseband controller 106. The radio unit 130 may include a fronthaul interface 124 that is configured to access an Ethernet network 110 to communicate with the one or more baseband controllers 106. The VRUs 104 may access the Ethernet network 110 (e.g., the Internet) using an encrypted connection. The fronthaul interface 124 may be implemented in the same programmable processor 136 as the VRUs 104. Alternatively, the fronthaul interface 124 may be located in the radio unit 130, but not implemented in the same programmable processor 136 as the VRUs 104. A single Ethernet port may act as the only physical data connection that is used by multiple VRUs 104 to communicate with the baseband controllers 106 (via the fronthaul interface 124 and Ethernet network 110). Optionally, a baseband controller 106 may receive the baseband signal and perform baseband processing on it.

The method 400 illustrated in FIG. 4 and the method 500 in FIG. 5 may be performed sequentially (method 400 followed by method 500 or method 500 followed by method 400). Alternatively, the methods 400, 500 may be performed in parallel. Alternatively, the steps of the methods 400, 500 may be mixed in between the steps of the other.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms may refer to direct or indirect connections. If the specification states a component or feature "may," "can," "could," or "might" be included or have a characteristic, that particular component or feature is not required to be included or have the characteristic.

The terms "responsive" or "in response to" may indicate that an action is performed completely or partially in response to another action. The term "module" refers to a functional component implemented in software, hardware, or firmware (or any combination thereof) component.

The methods disclosed herein comprise one or more steps or actions for achieving the described method. Unless a specific order of steps or actions is required for proper operation of the method that is being described, the order and/or use of specific steps and/or actions may be modified without departing from the scope of the claims.

In conclusion, the present disclosure provides novel systems, methods, and arrangements for a system with multiple VRUs in a radio unit that is remote from at least one baseband controller. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a communication system, comprising: at least one baseband controller configured to process signals in a baseband frequency band; at least one radio unit that is physically remote from the at least one baseband controller, wherein each radio unit comprises: a plurality of virtual radio units (VRUs) in a physical housing of the respective radio unit; a fronthaul interface configured to communicate with the at least one baseband controller using a packet-based protocol on behalf of each VRU; and at least one radio frequency front end unit configured to transmit from and receive on behalf of each of the VRUs.

Example 2 includes the communication system of Example 1, wherein the plurality of VRUs are implemented in a different processing core of at least one programmable processor.

Example 3 includes the communication system of Example 2, wherein the at least one programmable processor comprises a field programmable gate array (FPGA), an application specific integrated circuit (ASIC), a microprocessor, or a digital signal processor (DSP).

Example 4 includes the communication system of any of Examples 2-3, wherein each VRU implemented in the at least one programmable processor has a unique internet protocol (IP) address, wherein each VRU is individually addressable using the respective IP address.

Example 5 includes the communication system of any of Examples 2-4, wherein each VRU implemented in the at least one programmable processor has a unique internet protocol (IP) address port number, wherein each VRU is individually addressable using the respective IP address port number.

Example 6 includes the communication system of any of Examples 1-5, wherein the fronthaul interface accesses an Ethernet network on an encrypted link to communicate with one or more of the at least one baseband controller.

Example 7 includes the communication system of any of Examples 1-6, wherein the fronthaul interface may communicate with one or more of the at least one baseband controller, on behalf of the plurality of VRUs, via a single Ethernet port.

Example 8 includes the communication system of any of Examples 1-7, wherein a first VRU of the plurality of VRUs uses a different frequency band, air standard, or modulation scheme than a second VRU of the plurality of VRUs.

Example 9 includes the communication system of Example 8, wherein the first VRU is operated by a different wireless carrier than the second VRU.

Example 10 includes the communication system of any of Examples 1-9, wherein the at least one baseband controller is configured to send frequency-domain in-phase and quadrature (IQ) data to the at least one radio unit via an Ethernet network; and wherein the at least one radio unit is configured to perform an inverse fast Fourier transform (IFFT) on the frequency domain IQ data from the at least one baseband controller to produce time-domain IQ data.

Example 11 includes a method for using a radio unit with multiple VRUs to transmit a wireless signal to one or more wireless devices, the method being performed by a radio unit, the method comprising: receiving a baseband signal from at least one baseband controller, wherein the at least one baseband controller is physically remote from the radio unit, wherein the baseband signal is received using a packet-based protocol; performing processing to convert the baseband signal into a radio frequency (RF) signal, wherein the processing is performed by an RF front end unit and at least one of a plurality of virtual radio units (VRUs) in a physical housing of the radio unit; and transmitting the RF signal to one or more wireless devices via one or more antennas.

Example 12 includes the method of Example 11, wherein each of the plurality of VRUs are implemented in a different processing core of at least one programmable processor.

Example 13 includes the method of Example 12, wherein the at least one programmable processor comprises a field programmable gate array (FPGA), an application specific integrated circuit (ASIC), a microprocessor, or a digital signal processor (DSP).

Example 14 includes the method of any of Examples 12-13, wherein each VRU implemented in the at least one programmable processor has a unique internet protocol (IP) address, wherein each VRU is individually addressable using the respective IP address.

Example 15 includes the method of any of Examples 12-14, wherein each VRU implemented in the programmable at least one processor has a unique internet protocol (IP) address port number, wherein each VRU is individually addressable using the respective IP address port number.

Example 16 includes the method of any of Examples 11-15, wherein the fronthaul interface may communicate with one or more of the at least one baseband controller, on behalf of the plurality of VRUs, via a single Ethernet port.

Example 17 includes a method for using a radio unit with multiple VRUs to receive a wireless signal from a wireless device, the method being performed by a radio unit, the method comprising: receive an analog radio frequency (RF) signal from the wireless device via the one or more antennas, performing processing to convert the received analog RF signal into a baseband signal, wherein the processing is performed by an RF front end unit and at least one of a plurality of virtual radio units (VRUs) in a physical housing of the radio unit; and transmit the baseband signal to at least one baseband controller comprising at least one baseband controller, wherein the at least one baseband controller is physically remote from the radio unit, wherein the baseband signal is transmitted using a packet-based protocol.

Example 18 includes the method of Example 17, wherein each of the plurality of VRUs are implemented in a different processing core of at least one programmable processor.

Example 19 includes the method of Example 18, wherein the at least one programmable processor comprises a field programmable gate array (FPGA), an application specific integrated circuit (ASIC), a microprocessor, or a digital signal processor (DSP).

Example 20 includes the method of any of Examples 18-19, wherein each VRU implemented in the at least one programmable processor has a unique internet protocol (IP) address, wherein each VRU is individually addressable using the respective IP address.

Example 21 includes the method of any of Examples 18-20, wherein each VRU implemented in the at least one programmable processor has a unique internet protocol (IP) address port number, wherein each VRU is individually addressable using the respective IP address port number.

Example 22 includes the method of any of Examples 17-19, wherein the fronthaul interface may communicate with one or more of the at least one baseband controller, on behalf of the plurality of VRUs, via a single Ethernet port.

The invention claimed is:

1. A communication system, comprising:
    at least one baseband controller configured to process signals in a baseband frequency band;
    at least one radio unit that is physically remote from the at least one baseband controller, wherein each radio unit comprises:
        a plurality of virtual radio units (VRUs) in a physical housing of the respective radio unit, wherein at least two of the plurality of VRUs are each implemented in a different processing core of a programmable processor;
        a fronthaul interface configured to communicate with the at least one baseband controller using a packet-based protocol on behalf of each VRU; and
        at least one radio frequency front end unit configured to transmit from and receive on behalf of each of the VRUs.

2. The communication system of claim 1, wherein the programmable processor comprises a field programmable gate array (FPGA), an application specific integrated circuit (ASIC), a microprocessor, or a digital signal processor (DSP).

3. The communication system of claim 1, wherein each VRU implemented in the programmable processor has a unique internet protocol (IP) address, wherein each VRU is individually addressable using the respective IP address.

4. The communication system of claim 1, wherein each VRU implemented in the programmable processor has a unique internet protocol (IP) address port number, wherein each VRU is individually addressable using the respective IP address port number.

5. The communication system of claim 1, wherein the fronthaul interface accesses an Ethernet network on an encrypted link to communicate with one or more of the at least one baseband controller.

6. The communication system of claim 1, wherein the fronthaul interface may communicate with one or more of the at least one baseband controller, on behalf of the plurality of VRUs, via a single Ethernet port.

7. The communication system of claim 1, wherein a first VRU of the plurality of VRUs uses a different frequency band, air standard, or modulation scheme than a second VRU of the plurality of VRUs.

8. The communication system of claim 7, wherein the first VRU is operated by a different wireless carrier than the second VRU.

9. The communication system of claim 1,
    wherein the at least one baseband controller is configured to send frequency-domain in-phase and quadrature (IQ) data to the at least one radio unit via an Ethernet network; and
    wherein the at least one radio unit is configured to perform an inverse fast Fourier transform (IFFT) on the frequency domain IQ data from the at least one baseband controller to produce time-domain IQ data.

10. A method for using a radio unit with multiple VRUs to transmit a wireless signal to one or more wireless devices, the method being performed by a radio unit, the method comprising:
    receiving a baseband signal from at least one baseband controller, wherein the at least one baseband controller is physically remote from the radio unit, wherein the baseband signal is received using a packet-based protocol;
    performing processing to convert the baseband signal into a radio frequency (RF) signal, wherein the processing is performed by an RF front end unit and at least one of a plurality of virtual radio units (VRUs) in a physical housing of the radio unit, wherein at least two of the plurality of VRUs are each implemented in a different processing core of a programmable processor; and
    transmitting the RF signal to one or more wireless devices via one or more antennas.

11. The method of claim 10, wherein the programmable processor comprises a field programmable gate array (FPGA), an application specific integrated circuit (ASIC), a microprocessor, or a digital signal processor (DSP).

12. The method of claim 10, wherein each VRU implemented in the programmable processor has a unique internet protocol (IP) address, wherein each VRU is individually addressable using the respective IP address.

13. The method of claim 10, wherein each VRU implemented in the programmable processor has a unique internet protocol (IP) address port number, wherein each VRU is individually addressable using the respective IP address port number.

14. The method of claim 10, wherein the fronthaul interface may communicate with one or more of the at least one baseband controller, on behalf of the plurality of VRUs, via a single Ethernet port.

15. A method for using a radio unit with multiple VRUs to receive a wireless signal from a wireless device, the method being performed by a radio unit, the method comprising:
    receive an analog radio frequency (RF) signal from the wireless device via the one or more antennas,
    performing processing to convert the received analog RF signal into a baseband signal, wherein the processing is performed by an RF front end unit and at least one of a plurality of virtual radio units (VRUs) in a physical housing of the radio unit, wherein at least two of the plurality of VRUs are each implemented in a different processing core of a programmable processor; and
    transmit the baseband signal to at least one baseband controller comprising at least one baseband controller, wherein the at least one baseband controller is physically remote from the radio unit, wherein the baseband signal is transmitted using a packet-based protocol.

16. The method of claim 15, wherein the at least one programmable processor comprises a field programmable gate array (FPGA), an application specific integrated circuit (ASIC), a microprocessor, or a digital signal processor (DSP).

17. The method of claim 15, wherein each VRU implemented in the programmable processor has a unique internet protocol (IP) address, wherein each VRU is individually addressable using the respective IP address.

18. The method of claim 15, wherein each VRU implemented in the programmable processor has a unique internet protocol (IP) address port number, wherein each VRU is individually addressable using the respective IP address port number.

19. The method of claim 15, wherein a fronthaul interface may communicate with one or more of the at least one baseband controller, on behalf of the plurality of VRUs, via a single Ethernet port.

* * * * *